Aug. 9, 1966 N. S. McEWEN 3,265,439

SEAT BELT

Filed Nov. 19, 1963

INVENTOR.
NORMAN S. McEWEN
BY
Paul M. Craig, Jr.
ATTORNEY

United States Patent Office 3,265,439
Patented August 9, 1966

3,265,439
SEAT BELT
Norman S. McEwen, 437 NE. 8th Ave.,
Fort Lauderdale, Fla.
Filed Nov. 19, 1963, Ser. No. 324,781
10 Claims. (Cl. 297—385)

The present invention relates in general to safety restraining belts of the type used in automotive vehicles for restraining the passengers thereof in case of sudden stops or accidents. More particularly, the present invention relates to a novel snap-catch quick-release connector combination which will permit the fastening of a seat belt quickly and securely with the use of but one hand.

Safety seat belts have been presented in the prior art and on the commercial market in many forms and styles, and their value as a means of preventing serious injury has been extolled by all safety organizations and city and state governments. Tests have proven them to be so valuable that many states have now required by law that seat belts be included as standard equipment on all new cars sold within their jurisdiction. However, in spite of all the publicity extolling the value of automotive seat belts, the public acceptance of this safety device has been very luke warm. The percentage of people who have seat belts in their cars is quite low compared to what it should be, and those people who have had seat belts forced upon them by the law show a reluctance to use them.

Many theories have been set forth as to the reason for this apparent apathy regarding the use of seat belts; however, the reason which has most frequently been set forth, and especially by those who own a vehicle equipped with seat belts, is that it is inconvenient to fasten the seat belt every time one gets into and out of an automobile. It has also been stated that very often the driver will forget to fasten the seat belt until the automobile is under way, and at that time since it requires two hands to fasten most seat belts, it would be unsafe to fasten the seat belt without bringing the car to a stop. Rather than being inconvenienced in this way, the driver will merely not fasten the seat belt at all.

It has therefore become quite evident that public acceptance of seat belts might materially improve if a seat belt could be provided which was more convenient than those seat belts which are available on the market today. In particular, the public desires a seat belt which is extremely easy to fasten and unfasten so that the task of getting into and out of an automobile does not become a major chore. This factor is of great interest to salesmen and delivery people, for example, who must enter and leave their motor vehicles many times during the course of a day and would not use their seat belt unless it was extremely convenient to fasten and unfasten. Of course, it is just these people, who are in their motor vehicles for the majority of each day and therefore are more likely to be involved in an automobile accident, that really need the use of a motor vehicle seat belt. In addition to ease of fastening and unfastening, it is also necessary that the seat belt be provided with a quick release mechanism permitting fast escape of the driver or of the passenger from the automobile when necessary, such as after an accident has occurred. However, of prime importance in incorporating these desirable features into a seat belt is the necessity for preventing the sacrifice of structural strength without which the seat belt would not perform its intended function.

In meeting the above-mentioned requirements, the seat belt according to the instant invention provides a snap-lock quick-release connector which enables the driver to safely fasten his seat belt with the use of only one hand, and to release the seat belt in the same manner. Since only one hand is required in operating the seat belt, the belt may be fastened after the car is in motion without taking both hands from the steering wheel. In addition, the seat belt according to the instant invention provides a duplicate release mechanism in which with one simple motion, the snap lock which holds the seat belt in position may be quickly released from the connector thereby quickly freeing the driver or the passenger. This quick release mechanism which is part of the connector according to the instant invention can also be operated with but one hand.

It is therefore an object of the instant invention to provide an automotive safety seat belt which may be simply and safely fastened by the wearer with the use of but one hand.

It is another object of the present invention to provide an automotive safety seat belt which may be fastened by the driver of the automobile after the automobile is in motion without requiring the driver to take both hands from the steering wheel.

It is a further object of the present invention to provide an automotive safety seat belt containing a duplicate release mechanism which makes possible either a snap release of the belt or a quick release of the snap mechanism thereof.

It is still another object of the present invention to provide for an automotive safety seat belt a snap lock quick release connector which is designed to fit all standard safety seat belts.

It is still a further object of the present invention to provide a connector combination for a safety seat belt which provides for a direct interrelation between the snap lock mechanism and the quick release mechanism thereof.

By virtue of these and more specific features set forth with particularity in the claims annexed hereto, the invention provides an automotive safety seat belt and connector mechanism which exhibits far superior characteristics to those heretofore attainable with a design of much less simplicity. This will be more fully understood from the embodiment of the invention illustrated by way of example in the accompanying drawings, wherein FIGURE 1 illustrates a seat belt in accordance with the instant invention mounted within a vehicle so as to properly restrain the user;

Most seat belts of the prior art which are now commercially available consist of a pair of straps which fasten in front of the wearer at the level of his lap by passing one end of one of the straps through a slip-lock type of connector which is fastened to the free end of the other strap. Since two straps are involved and since it is necessary to insert the free end of one strap into a connector located on the free end of the other strap, the fastening of this type of seat belt can be readily accomplished only through the use of two hands. In addition, since two straps are involved, it is often very difficult to find one of the straps since they very often become wedged within the seat construction, or slip outside of the door and have the door closed upon them or become generally difficult to locate for other reasons. In short, these prior art seat belts have proven to be very inconvenient and have therefore tended to discourage the public with regard to their use.

Figure 1:
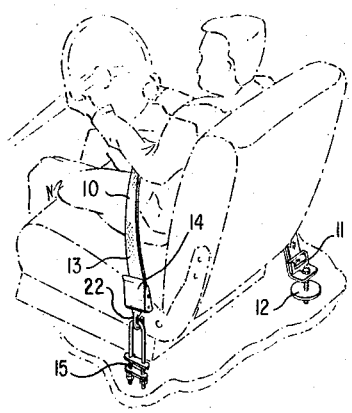

The seat belt according to the instant invention is generally illustrated in FIGURE 1 wherein the driver and the conventional automobile seat structure are illustrated in phantom-line so as to show all of the details of the instant invention and their interrelation. The belt portion itself is of standard configuration; however, in contrast to prior art belts, the seat belt according to the instant invention consists of one continuous belt 10 which is fastened at one end 11 to the automobile frame 12 in the conventional manner. The other end 13 of belt 10 contains a snap-lock quick-release connector 14 which comprises the instant invention. The connector 14 snap-locks into a support member 15 which is bolted to the frame 12 of the automobile. The support member 15 is shown in FIGURE 1 as a U-bolt; however, other configurations, such as an eye bolt or any other structure which will achieve comparable results and will accommodate a hook snap lock, may obviously be used.

Figure 4:
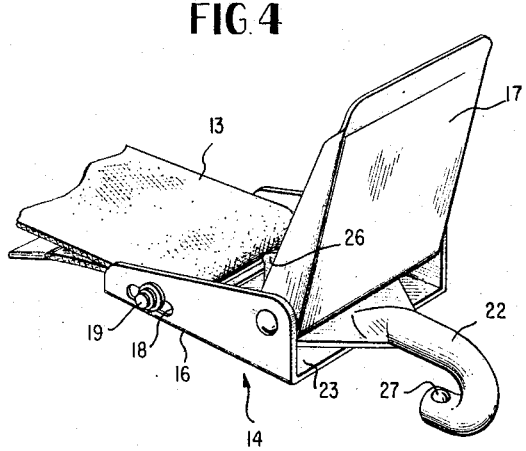
FIGURE 4 is a perspective view of the same connector in the open or quick-release position.
Figure 2:
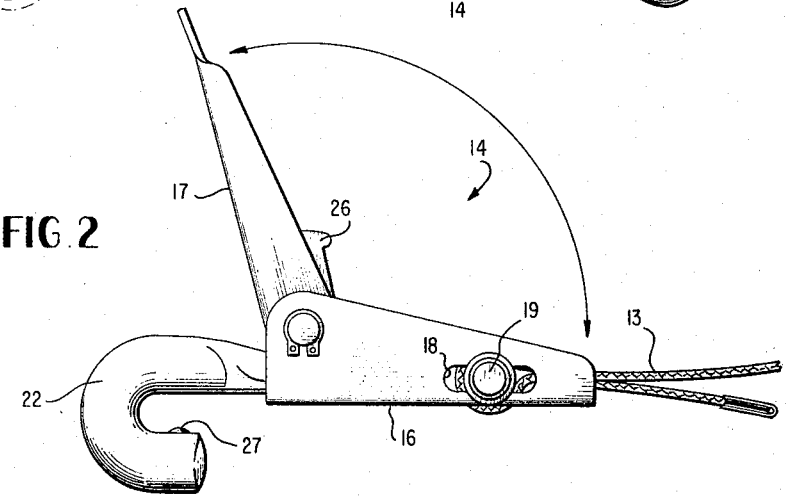
FIGURE 2 is a side view of the novel seat belt connector constructed in accordance with the instant invention.
Figure 3:
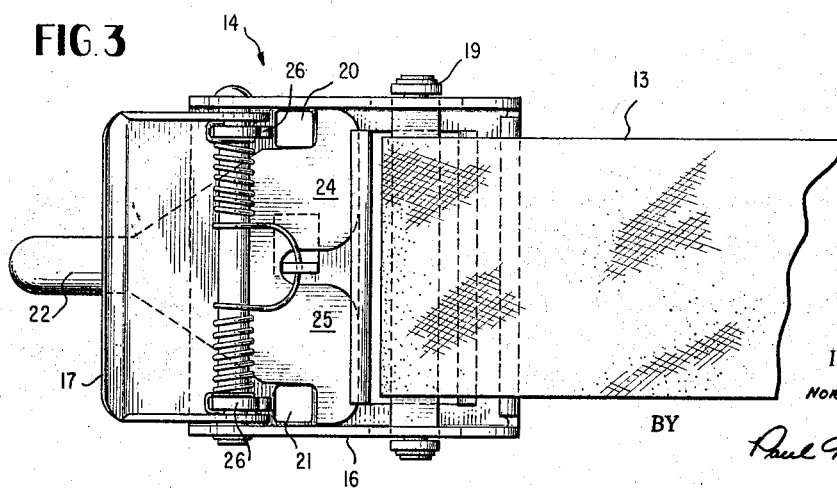
FIGURE 3 is a top view of the connector of FIGURE 2 illustrating all of the working parts thereof and their co-operating relationship.

The snap-lock quick-release connector which comprises the instant invention is shown in greater detail in FIGURES 2, 3 and 4. Like reference numerals have been used throughout the figures to designate like parts wherever possible. The connector 14 consists generally of a casing 16 having a closure member 17 which is normally spring-biased in the closed direction. Each of the sides of the casing 16 contain a slot 18 which accommodates the ends of a bar 19 which extends between the two side walls. The free end 13 of belt 10 is inserted into the casing 16 between the rear end thereof and the closure member 17. The belt is looped around the bar 19 in the manner shown in FIGURE 2 and the free end thereof is pulled out of the casing 16 in the rearward direction. Due to the fact that the bar 19 is movable within the slot 18, pressure upon the belt 10 in a direction away from the connector 14 will wedge the bar 19 against the free end of the belt 13 and lock it within the casing 16. In the alternative, the overall length of the belt 10 may be adjusted by further looping the ends 13 around the bar 19 which may quite easily be done by exerting a force on the belt in a direction toward the connector 14 and simultaneously applying a pressure on the free end thereof away from the connector. By providing a means for adjusting the overall length of the belt 10 which is somewhat permanent in nature, one eliminates the necessity for adjusting the tightness of the belt each time it is fastened and unfastened.

The web portion 23 of the casing 16 contains a pair of apertures 20 and 21 which are in substantial alignment. The closure member 17 is pivotally mounted on the side walls of the casing 16 and is spring-loaded so as to normally bear down against the belt portion 13. A space or opening exists between the front portion of the closure member 17 and the front edge of the web portion 23 on casing 16 into which a hook-shaped member 22 having a flat flange portion embodying two projections 24 and 25 is accommodated. The projections 24 and 25 pass around the apertures 20 and 21 in the casing 16 so as to be positioned on the opposite side of the apertures from the front of the casing.

The closure member 17 has associated therewith a pair of lug members 26 which engage into the apertures 20 and 21, respectively, when the closure member 17 is in the closed position. With the lug members 26 protruding through the apertures 20 and 21, the snap lock member 22 is firmly held within the connector 14 since in this position the projections 24 and 25 cannot pass the apertures 20 and 21.

The snap-lock mechanism has a hook-shaped end 22 which has mounted in the end thereof a spring biased ball 27. The hook-shaped end 22 is designed to accommodate a U-bolt or an eye bolt such as shown in FIGURE 1, and the spring-biased ball 27 is positioned on the end of this hook portion so as to catch the support member 15 with a firm hold and restrain it in a rattle free grip. Once the support member passes the spring biased ball 27, the member will be held firmly against the inside surface of the hook portion by the ball preventing accidental unfastening of the connection.

Having the details of the construction of the instant invention firmly in mind, the advantages which are derived from this construction become readily apparent. Having adjusted the overall length of the belt so that the desired degree of tension is provided when the connector 14 is latched to the support member 15, it is obvious that a latching of the seat belt may be accomplished with one hand by merely hooking the projection 22 over the support member 15. The free end 13 of the belt 10 will therefore be locked to the support member 15 by the spring biased ball 27. The belt may be quickly removed in a similar manner by merely exerting a downward pressure on the connector 14 slipping the support member 15 past the spring-biased ball 27. In case of accident, because of the serial latching arrangement the belt may be disengaged from the hook-shaped member 22 by quickly lifting the closure member 17 which frees the hook-shaped projections 24 and 25 and permits the entire hook-shaped member 22 to slip from the connector 14.

While I have shown and described a specific embodiment in accordance with the instant invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A safety seat belt of the type used in automotive vehicles for restraining the passengers thereof in case of sudden stop comprising a belt having one end fastened to the chassis of the motor vehicle and means for releasably securely latching the other end of said belt to the vehicle chassis in such a way that the connection and disconnection thereof may be effected with the use of only one hand, said means including a pair of serially connected latches.

2. A safety seat belt of the type used in automotive vehicles for restraining the passengers thereof in case of sudden stop comprising a belt having one end fastened to the chassis of the motor vehicle and means for releasably securely connecting the other end of said belt to the vehicle chassis in such a way that the connection and disconnection thereof may be effected with the use of only one hand, including connector means consisting of a first member and a second member detachably latched to each other, said first member releasably latching said connector means to said vehicle chassis and said second member being capable of quickly releasing said first member.

3. A safety seat belt of the type used in automotive vehicles for restraining the passengers thereof in case of sudden stop comprising a belt having one end fastened to the chassis of the motor vehicle and means for releasably securely connecting the other end of said belt to the vehicle chassis in such a way that the connection and disconnection thereof may be effected with the use of only one hand, including securing means secured to said vehicle chassis, connector means having a first member and a second member detachably latched to each other, said first member having a hook-shaped portion engageable with said securing means on said vehicle chassis so as to releasably latch said connector means to said securing means, and said second member being capable of quickly releasing said first member.

4. A safety seat belt of the type used in automotive vehicles for restraining the passengers thereof in case of sudden stop comprising a belt having one end fastened to the chassis of the motor vehicle and means for releasably securely connecting the other end of said belt to the vehicle chassis in such a way that the connection and disconnection thereof may be effected with the use of only one hand, including securing means secured to said vehicle chassis, connector means having a first member and a second member detachably latched to each other, said first member having a hook-shaped portion engageable with a securing means on said vehicle chassis so as to releasably latch said connector means to said securing means and said second member having a casing and a closure means biased in the closed position releasably securing said first member within said casing, said casing being adjustably secured to said other end of said belt.

5. A connector for an automotive safety seat belt of the type utilizing one continuous belt having one end permanently fastened to the vehicle chassis and the other end releasably latched to said chassis through said connector comprising a first latch member and a second latch member, said first latch member being releasably latched to said vehicle chassis, and said second latch member being releasably latched to said first member so as to provide at least two means for detaching said other end of said belt from said chassis.

6. A connector for an automotive safety seat belt of the type utilizing one continuous belt having one end permanently fastened to the vehicle chassis and the other end releasably fastened to said chassis through said connector comprising at least two serially connected means for independently detaching said other end of said belt from said chassis including a first member and a second member, said first member having a hook-shaped portion engageable with a securing means on said vehicle chassis, and said second member being releasably latched to said first member.

7. A connector for an automotive safety seat belt of the type utilizing one continuous belt having one end permanently fastened to the vehicle chassis and the other end releasably fastened to said chassis through said connector comprising a first latch member and a second latch member, said first latch member having a hook-shaped portion engageable with a securing means on said vehicle chassis and a flange portion, said second member having a casing and a closure means biased in the closed position, said flange portion being releasably latched within said casing by said closure means of said first latch member.

8. A connector for an automotive safety seat belt of the type utilizing one continuous belt having one end permanently fastened to the vehicle chassis and the other end releasably fastened to said chassis through said connector comprising a first hook-shaped member having a spring-biased means located within the free end of said hook for restricting the opening of said hook, means secured to the vehicle chassis and engaged by said hook-shaped member and restrained by said spring-biased means, and a second member releasably latched to said hook-shaped member at the end thereof opposite said spring-biased means, said second member being also adjustably secured to said other end of said belt.

9. A connector for an automotive safety seat belt of the type utilizing one continuous belt having one end permanently fastened to the vehicle chassis and the other end releasably fastened to said chassis through said connector comprising a first hook-shaped member having means located at the free end of said hook for restricting the opening of said hook, means secured to the vehicle chassis and engaged by said hook-shaped member and restrained by said restricting means, said hook-shaped member having a flange portion connected to said hook, and a second member having a casing and a closure means associated with said casing for releasably engaging said flange portion in the closed position thereof and means for adjustably securing said other end of said belt to said casing.

10. A connector for an automotive safety seat belt of the type utilizing one continuous belt having one end permanently fastened to the vehicle chassis and the other end releasably fastened to said chassis through said connector comprising a first hook-shaped member having a spring biased means located in the opening of said hook for restricting said opening, means secured to the vehicle chassis and engaged by said hook and restrained by said spring-biased means, said hook-shaped member having a flange portion carrying a pair of projections, and a second member having a casing and a closure means pivotally mounted on said casing and biased closed for engaging the projections on said flange portion only in the closed position thereof and means for adjustably securing said other end of said belt to said casing.

References Cited by the Examiner
UNITED STATES PATENTS

| | | | |
|---|---|---|---|
| 649,460 | 5/1900 | Jordan | 24—239 |
| 831,745 | 9/1906 | Rice | 24—239 |
| 2,561,144 | 7/1951 | Seaton | 24—201.4 |
| 2,775,288 | 12/1956 | Anastasia | 297—385 |
| 2,854,248 | 9/1958 | Stocker | 297—385 |
| 3,043,625 | 7/1962 | Bohlin | 297—389 |
| 3,062,585 | 11/1962 | Bentley | 297—389 |
| 3,078,538 | 2/1963 | Brown | 24—230.1 |
| 3,126,227 | 3/1964 | Bollinger | 297—385 |
| 3,130,467 | 4/1964 | Davis | 24—230.1 |
| 3,142,103 | 7/1964 | Lindblad | 24—230.1 |

FOREIGN PATENTS 871,819  7/1961  Great Britain.

FRANK B. SHERRY, *Primary Examiner.*

J. S. PETRIE, R. B. FARLEY, *Assistant Examiners.*